US012320372B2

(12) United States Patent
Nakajima et al.

(10) Patent No.: US 12,320,372 B2
(45) Date of Patent: Jun. 3, 2025

(54) CALIBRATION SYSTEM AND CALIBRATION METHOD IN HYDRAULIC SYSTEM

(71) Applicant: Caterpillar SARL, Geneva (CH)

(72) Inventors: Hideki Nakajima, Akashi (JP); Koichi Kiyasu, Akashi (JP)

(73) Assignee: Caterpillar SARL, Geneva (CH)

( * ) Notice: Subject to any disclaimer, the term of this patent is extended or adjusted under 35 U.S.C. 154(b) by 0 days.

(21) Appl. No.: 18/457,775

(22) Filed: Aug. 29, 2023

(65) Prior Publication Data

US 2024/0068492 A1 Feb. 29, 2024

(30) Foreign Application Priority Data

Aug. 29, 2022 (JP) ................................ 2022-135612

(51) Int. Cl.
*F15B 19/00* (2006.01)
*E02F 9/22* (2006.01)

(52) U.S. Cl.
CPC .......... *F15B 19/002* (2013.01); *E02F 9/2285* (2013.01); *E02F 9/2296* (2013.01); (Continued)

(58) Field of Classification Search
CPC ..... E02F 9/2285; E02F 9/2296; F15B 19/002; F15B 2211/20546; F15B 2211/20553; F15B 2211/30535
See application file for complete search history.

(56) References Cited

U.S. PATENT DOCUMENTS 5,048,293 A * 9/1991 Aoyagi ................. E02F 9/2235 60/420
5,289,679 A * 3/1994 Yasuda ................. E02F 9/2285 60/452

(Continued)

FOREIGN PATENT DOCUMENTS

JP 2986818 B2 12/1999
JP 2007278490 A 10/2007

(Continued)

*Primary Examiner* — Matthew Wiblin

(57) ABSTRACT

Problem: Calibrating a correspondence relationship between a pump control current value and a pump flow rate of the hydraulic pump in a hydraulic system including a variable capacity hydraulic pump whose capacity is variably controlled according to the pump control current value, a flow rate control valve whose opening area is variably controlled according to a valve control current value, and a pressure compensation valve that maintains differential pressure before and after the flow control valve to be constant is made in a precise and simple manner. Solution: The spool valve has a configuration in which the pump control current value is sweepingly increased and the peak of a change of pump pressure during the sweeping increase is calibrated as the pump control current value of the pump flow rate of the target flow rate, with the spool valve held in the aperture area corresponding to the spool valve output flow rate of the arbitrary target flow rate. With the spool valve maintained at an opening area corresponding to an output flow rate of the spool valve of an arbitrary target flow rate, the pump control current value sweepingly increases, and the peak of the change of the pump pressure during the sweeping increase is calibrated as the pump control current value of the pump flow rate of the target flow rate.

2 Claims, 3 Drawing Sheets

(52) U.S. Cl.
CPC ............... *F15B 2211/20546* (2013.01); *F15B 2211/20553* (2013.01); *F15B 2211/30535* (2013.01)

(56) References Cited

U.S. PATENT DOCUMENTS

| | | | | |
|---|---|---|---|---|
| 5,394,696 | A * | 3/1995 | Eich | F15B 21/087<br>60/420 |
| 2022/0106770 | A1 * | 4/2022 | Muraoka | E02F 9/2228 |

FOREIGN PATENT DOCUMENTS

| | | | |
|---|---|---|---|
| JP | 2008303813 | A | 12/2008 |
| JP | 201477969 | A | 9/2014 |

* cited by examiner

CALIBRATION SYSTEM AND CALIBRATION METHOD IN HYDRAULIC SYSTEM

CROSS-REFERENCE TO RELATED APPLICATION

This application claims priority under 35 USC $119 and the Paris Convention to Japanese Patent Application 2022-135612 filed on Aug. 29, 2022.

TECHNICAL FIELD

The present invention relates to the technical field of calibration system and calibration method in a hydraulic system of a working machine such as a hydraulic excavator.

BACKGROUND

Generally speaking, the hydraulic system of a working machine such as a hydraulic excavator is configured to use a variable capacity hydraulic pump, as a hydraulic source of the various hydraulic actuators, whose capacity is variably controlled according to a control current value output from a controller. In this case, the controller stores data indicating a correspondence relationship between the pump flow rate of the hydraulic pump and the control current value, and the calculated control current value using that data is output from the controller.

For the data indicating the correspondence relationship between the pump flow rate and the control current value, a pre-created specification is stored in the controller, and the control current value using the data in the specification is output. However, due to manufacturing dispersion, aging, and the like, there are cases where a discrepancy occurs between the pump flow rate value of the data in the specification for the control current value and the actual pump flow rate value.

Therefore, conventionally, as a calibration for matching the value of the data in the specification to the actual value, a technique for corresponding to the change point of the pressure value captured by changing the control current value while monitoring the pressure value acting on the actuator piston which variably adjusts the swash plate tilt angle of the hydraulic pump, calculating the current value at least one of the actual minimum swash plate position and maximum swash plate position, and correcting the control current value by way of the difference between the actual control current value and the control current value in the specification (see, for example, Patent Document 1), and a technique for updating the control parameters pertaining to the control current value based on the control current value and the pump pressure when the discharge flow rate of the hydraulic pump is set to the maximum flow rate and the minimum flow rate (see, for example, Patent Document 2). These Patent Documents 1 and 2 do not require a tilt angle sensor of a swash plate or a flow meter for calibration, and can be calibrated at a low cost with a simple configuration.

PRIOR ART DOCUMENTS

Patent Documents

Patent Document 1: JP 2008-303813A
Patent Document 2: JP 2014-177969A

SUMMARY OF THE INVENTION

Problems to be Solved by the Invention

When calibrating the pump flow rate (pump capacity) relative to the control current value of the hydraulic pump, both of the above Patent Documents 1 and 2 calculate a calibration value of the control current value relative to the minimum flow rate and the maximum flow rate based on the pressure change when the pump flow rate becomes the minimum flow rate (the minimum swash plate position) and the maximum flow rate (the maximum swash plate position), and use the calibrated value to also calibrate the control current value for the entire range of flow rates between the minimum flow rate and the maximum flow rate. However, it is difficult to find an accurate pressure displacement point because the pressure is too low when the hydraulic pump is at the minimum flow rate, and it is also difficult to find an accurate pressure displacement point because there is a fear that the engine output will drop when the hydraulic pump is at the maximum flow rate. Therefore, it is difficult to accurately calculate the calibration value of the control current value for the minimum flow rate and maximum flow rate. In other words, in Patent Documents 1 and 2, the calibration is carried out at the minimum flow rate and the maximum flow rate, which are difficult to calculate the calibration value having good accuracy. Therefore, there is a problem that the accuracy of the calibration is inferior, which is a problem to be solved by the present invention.

Means for Solving the Problem

The present invention is created for the purpose of solving the problem in light of the above-mentioned circumstances. The invention according to claim 1 is a calibration system in a hydraulic system of a working machine, characterized in that in the hydraulic system of the working machine which includes a variable capacity hydraulic pump whose capacity is variably controlled according to a pump control current value; a flow rate control valve which is disposed in a pressurized oil supply path from the hydraulic pump to a hydraulic actuator, and whose opening area of a supply opening is variably controlled in accordance with a valve control current value; a pressure compensation valve that is disposed on an upstream side of the flow control valve and is actuated to maintain differential pressure before and after the flow control valve to be constant; and a controller for outputting a pump control current and a valve control current, when calibrating a correspondence relationship between the pump control current value and a pump flow rate of the hydraulic pump, a pressure detection means for detecting pump pressure of the hydraulic pump is provided, while a relief oil path is connected an output side of the flow control valve to flow an output flow rate to an oil tank at low back pressure, wherein the controller includes: a valve control means that calculates the valve control current value corresponding to an output flow rate of the control valve of an arbitrarily set target flow rate based on calibrated corresponding data of the valve control current value and the output flow rate of the flow rate control valve, and outputs the valve control current value as a calibration valve control current value; a pump control means that sweepingly increases and outputs the pump control current value in a state of outputting the calibration valve control current value; and a calibration control means that calculates the pump control current value when a change of pump pressure during a sweeping increase peaks, and calibrates the pump control current value as a pump control current value corresponding to a pump flow rate of the arbitrarily set target flow rate.

The invention according to claim 2 is a calibration method in a hydraulic system of a working machine, characterized in that in the hydraulic system of the working machine which includes a variable capacity hydraulic pump whose capacity is variably controlled according to a pump control current value, a flow rate control valve which is provided in a pressurized oil supply path from the hydraulic pump to a hydraulic actuator and an opening area of a supply opening is variably controlled according to a valve control current value, a pressure compensation valve which is provided on an upstream side of the flow rate control valve and is actuated to keep differential pressure before and after the flow rate control valve to be constant, and a controller for outputting a pump control current and a valve control current, when calibrating a correspondence relationship between the pump control current value and a pump flow rate of the hydraulic pump, a pressure detection means for detecting pump pressure of the hydraulic pump is provided, while a relief oil path is connected to an output side of the flow control valve to flow an output flow rate to an oil tank at a low back pressure, wherein the calibration includes: a step of calculating, on the basis of calibrated corresponding data between the valve control current value and the output flow rate of the flow rate control valve, the valve control current value corresponding to the output flow rate of the flow control valve of an arbitrarily set target flow rate, and outputting the valve control current value from the controller as a calibration valve control current value; a step of sweepingly increasing and outputting from the controller the pump control current value in a state of outputting the calibration valve control current value; and a step of calculating the pump control current value when a change of pump pressure during a sweeping increase peaks, and calibrating the pump control current value as a pump control current value corresponding to a pump flow rate of the arbitrarily set target flow rate.

Effect of the Invention

By means of the invention of claims 1 and 2, high precision calibration can be performed efficiently and easily.

DETAILED DESCRIPTION

Figure 1:
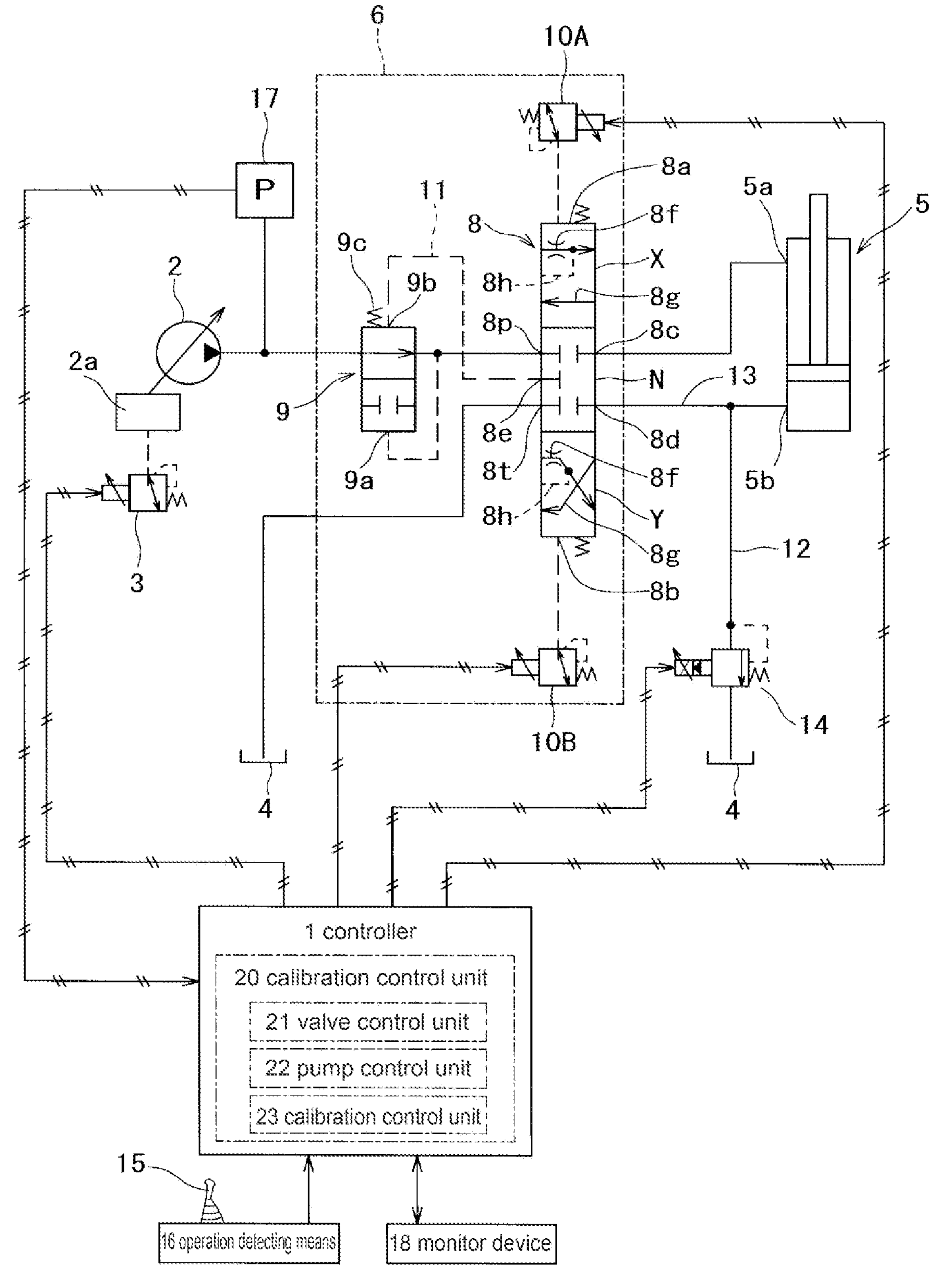
FIG. 1 is a hydraulic circuit diagram illustrating a part of a hydraulic system of a working machine.

Embodiments of the present invention will be described below with reference to the drawings. FIG. 1 illustrates a part of a hydraulic system provided on a working machine, such as a hydraulic excavator. In FIG. 1, 1 represents an on-board controller (a control device); 2 represents a variable capacity hydraulic pump; 2*a* represents a variable capacity means of the variable capacity hydraulic pump 2; 3 represents a solenoid pump proportional valve for a pump; 4 represents an oil tank; 5 represents a hydraulic actuator using the hydraulic pump 2 as a hydraulic source; and 6 represents a control valve that is provided in a pressurized oil supply path from the hydraulic pump 2 to the hydraulic actuator 5 and controls the supply and discharge of the hydraulic actuator 5.

In addition, when the working machine is a hydraulic excavator, the hydraulic excavator is provided with various hydraulic actuators, such as a boom cylinder, a stick cylinder, a bucket cylinder, a walking motor, a rotary motor, an optional accessory hydraulic actuator, and the like, and is provided with a single or a plurality of hydraulic pumps as hydraulic supply sources for these hydraulic actuators. FIG. 1 shows only a hydraulic pump 2 implementing the calibration of the present embodiment and a circuit for calibrating the hydraulic pump 2.

The pump proportional valve 3 outputs the pump control signal pressure in accordance with the pump control current value based on the pump control current value input from the controller 1, to the capacity variable unit 2*a* of the hydraulic pump 2. The capacity variable means 2*a* operates according to the input pump control signal pressure to control the flow rate of the hydraulic pump 2, and thus the pump flow rate of the hydraulic pump 2 is variably controlled in accordance with the pump control current value output from the controller 1 to the pump solenoid proportional valve 3.

The control valve 6 is configured to include a pilot-actuated spool valve 8 (it is equivalent to a flow rate valve of the present invention) described later, a pressure compensation valve 9 disposed on an upstream side of the spool valve 8, and a first solenoid proportional valve 10A and a second solenoid proportional valve 10B which both output pilot pressures to the spool valve 8.

The spool valve 8 is a direction switching valve for controlling the supply and discharge flow rates of the hydraulic actuator 5 and switching the supply and discharge directions, and includes first and second pilot ports 8*a* and 8*b* respectively connected to the first and second solenoid proportional valves 10A and 10B, a pump port 8*p* connected to the hydraulic pump 2 via the pressure compensation valve 9, a tank port 8*t* connected to the oil tank 4, a first actuator port 8*c* connected to a first input/output port 5*a* of the hydraulic actuator 5, a second actuator port 8*d* connected to a second input/output port 5*b* of the hydraulic actuator 5, and a load pressure output port 8*e* connected to a second pilot port 9*b* (described later) of the pressure compensation valve 9 via a load pressure introduction oil path 11. And when the pilot pressure is not input into both the first and second pilot ports 8*a*, 8*b*, the spool valve 8 does not control the supply and discharge of the hydraulic actuator 5, and when the load pressure output port 8*e* is located at a neutral position N where the load pressure port 8*e* is closed, the first pilot port 8*a* is input the pilot pressure and then is switched to the first operating position X, a supply opening 8*f* from the pump port 8*p* to the first actuator port 8*c*, a discharge output 8*g* from the second actuator port 8*d* to the tank port 8*t*, and a load pressure opening 8*h* from a downstream side of the supply opening 8*f* to the load pressure output port 8*e* are opened; and when the second pilot port 8*b* is input the pilot pressure, thereby switching to the second operating position, the supply opening 8*f* from the pump port 8*p* to the second actuator port 8*d*, the discharge port 8*g* from the first actuator port 8*c* to the tank port 8*t*, and the load pressure opening 8*h* from a downstream side of the supply opening 8*f* to the load pressure output port 8*e* are opened. The opening area of the supply opening 8*f* is determined in accordance with the moving stroke of the spool valve 8, which is moved by the pilot pressure output from the first and second solenoid proportional valves 10*a* and 10*b*, and the output flow rate from the spool valve 8 to the hydraulic actuator 5 is controlled by the opening area of the supply opening 8*f* Further, in the spool valve 8 at the first and second operating positions X and Y, when the load pressure opening 8*h* is opened, the outlet side pressure of the spool valve 8 (the load pressure of the hydraulic actuator 5) is introduced into the load pressure introduction oil passage 11.

The pressure compensation valve 9 includes a first pilot port 9*a* in which an inlet side pressure of the spool valve 8 is input, a second pilot port 9*b* in which outlet side pressure of the spool valve 8 is input via the load pressure introduction oil path 11, and a spring 9*c*. The inlet side pressure of the spool valve 8 input to the first pilot port 9*a* pushes a valve body of the pressure compensation valve 9 to a closed side, and the outlet side pressure of the spool valve 8 input to the second pilot port 9*b* and the pressing pressure of the spring 9*c* push the valve body of the pressure compensation valve 9 to an open side. The opening area of the pressure compensation valve 9 is then controlled so that a differential pressure between the inlet side pressure and the outlet side pressure of the spool valve 8 is constant. In other words, when the differential pressure before and after the spool valve 8 becomes greater, the valve body of the pressure compensation valve 9 moves to the closed side and the opening area of the pressure compensation valve 9 becomes reduced and then the passage pressure loss becomes increased, thereby reducing the inlet side pressure of the spool valve 8. On the other hand, when the differential pressure before and after the spool valve 8 becomes reduced, the valve body of the pressure compensation valve 9 moves to the opening side and the opening area of the pressure compensation valve 9 becomes increased and then the passage pressure loss becomes reduced, thereby increasing the inlet side pressure of the spool valve 8. In this way, the differential pressure before and after the spool valve 8 is held constant by such operations of the pressure compensation valve 9.

Here, the output flow rate from the spool valve 8 to the hydraulic actuator 5 is calculated by the opening area of the supply opening 8*f* of the spool valve 8, the differential pressure before and after the spool valve 8, and a flow rate coefficient by means of the following orifice formula (1).

$$Q=C\times A\times\sqrt{\Delta P} \quad (1)$$

In the above formula (1), Q is the output flow rate from the spool valve 8, C is the flow coefficient, A is the opening area of the supply opening 8*f* of the spool valve 8, and ΔP is the differential pressure before and after the spool valve 8.

As described above, the differential pressure ΔP before and after the spool valve 8 is held constant by the pressure compensation valve 9, and the opening area A of the supply opening 8*f* is determined in accordance with the pilot pressure output from the first and second solenoid proportional valves 10A and 10B. Thus, if the flow coefficient C is considered to be constant, the output flow rate from the spool valve 8 to the hydraulic actuator 5 is determined in accordance with the pilot pressure output from the first and second solenoid proportional valves 10A and 10B, even if the pump pressure of the hydraulic pump 2 and the load of the hydraulic actuator 5 fluctuate.

The first and second solenoid proportional valves 10A and 10B respectively output pilot pressure corresponding to the valve control current value to the first and second pilot ports 8*a* and 8*b* of the spool valve 8 on the basis of the valve control current value input from the controller 1. Then the spool valve 8 opens the supply opening 8*f* and the discharge opening 8*g* to an opening area corresponding to the input pilot pressure so as to perform supply flow control and discharge flow rate control for the hydraulic actuator 5, and at the same time, the differential pressure before and after the spool valve 8 is kept constant by the pressure compensation valve 9, and the output flow rate from the spool valve 8 is variably controlled in accordance with the valve control current value output from the controller 1 to the first and second solenoid proportional valves 10A and 10B.

In FIG. 1, 12 is a relief oil path formed by branching from the actuator oil path 13 which connects the control valve 6 and the hydraulic actuator 5, to the oil tank 4, and the relief oil path 12 is provided with a variable relief valve 14 that can change the relief pressure based on the control signal from the controller 1. For example, in the case where the hydraulic actuator 5 is a hydraulic actuator that requires to reduce the back pressure such as a breaker, setting the set pressure of the variable relief valve 14 to low pressure makes it possible to flow the oil discharged from the hydraulic actuator 5 through the relief oil path 12 to the oil tank 4 in a low back pressure state.

Further, in FIG. 1, 18 is a monitor device 18 connected to the controller 1 in a manner of input and output free, and the monitor device 18 is arranged, for example, in an operating cabin of a hydraulic excavator, and includes a display screen (not shown), an operation means such as a keyboard, a touch panel, a dial, and the like. And it is used when performing various types of displays, settings, and the like. However, in the present embodiment, the starting, working, and finishing of the calibration can be performed by the operations of the operation means of the monitor device 18.

On the other hand, on the input side, the controller 1 is connected with an operation detecting means 16 that detects an operating direction and an operating amount of the operating tool 15 of the hydraulic actuator 5, a pressure sensor 17 (it is equivalent to the pressure detection means of the present invention), and the like, while on the output side, the controller 1 is connected with the pump solenoid proportional valve 3, the first and second solenoid proportional valves 10A and 10B and the like. Then, in the normal operation in which the calibration described later is not executed, the controller 1 calculates a target pump flow rate based on an operation direction and an operation amount of the operation tool 15 inputted from the operation detecting means 16, pump pressure inputted from the pressure sensor 17, and the like, and outputs a pump control current value to the pump solenoid proportional valve 3 so that the pump flow rate of the hydraulic pump 2 becomes the target pump flow rate. In this case, the controller 1 is configured to store the pump corresponding data PD indicating a correspondence relationship between the pump control current value and the pump flow rate, and output the pump control current value corresponding to the target pump flow rate to the pump solenoid proportional valve 3 based on the pump corresponding data PD. As described above, the pump solenoid proportional valve 3 outputs the pump control signal pressure according to the pump control current value to the capacity variable means 2*a* of the hydraulic pump 2, thereby controlling the discharge flow rate of the hydraulic pump 2 to be the target pump flow rate. When the calibration described later is performed, the pump control current is outputted from the controller 1 to the pump solenoid proportional valve 3 in a state where the operation tool 15 is not operated.

Further, during normal operation in which the calibration is not performed, the controller 1 calculates the actuator requested flow rate based on the operation direction and the operation amount of the operation tool 15 input from the operation detecting means 16, and outputs the valve control current to the first and second solenoid proportional valves 10A and 10B such that the output flow rate from the spool valve 8 to the hydraulic actuator 5 becomes the actuator requested flow rate. In this case, the controller 1 is configured to store the valve corresponding data VD indicating a correspondence relationship between the output flow rate of the spool valve 8 and the valve control current value, and output the valve control current value corresponding to the actuator request flow rate to the first and second solenoid proportional valves 10A and 10B based on the valve corresponding data VD. As described above, the first and second solenoid proportional valves 10A and 10B output the pilot pressure corresponding to the valve control current value input from the controller 1 to the spool valve 8, thereby controlling the output flow rate from the spool valve 8 to the hydraulic actuator 5 so that it becomes the flow rate required by the actuator. In addition, when the calibration described later is performed, a valve control current is output from the controller 1 to the second solenoid proportional valve 10B in a state where the operation tool 15 is not operated.

Here, the valve corresponding data VD indicating the correspondence relationship between the output flow rate of the spool valve 8 and the valve control current value is used to calibrate the correspondence relationship between the pump flow rate and the pump control current value, as will be described later. However, the valve corresponding data VD used for the calibration is not an article in the specification, and the calibrated valve corresponding data VD that calibrates the correspondence relationship between the output flow rate of the spool valve 8 and the valve control current value based on the actual measurement data is used. The calibrated valve corresponding data VD is created, for example, on the supplier side of the control valve 6, based on the actual measurement data carried out in the pre-shipment inspection of the control valve 6, and is input to using a monitoring device 18 or via other input means or communication means, and stored in the controller 1. In addition, when the control valve 6 is installed in the hydraulic excavator, the correspondence relationship between the output flow rate of the spool valve 8 and the valve control current value is actually measured, and the valve corresponding data VD according to the specifications can be calibrated based on the actually measured data to obtain the valve corresponding data VD that has been calibrated. The calibrated valve correspondence data VD is used not only for calibrating the correspondence relationship between the pump flow rate and the pump control current value, but also for the aforementioned normal operation.

Further, the controller 1 is provided with a calibration control unit 20 for controlling the calibration of the corresponding relationship between the pump control current value and the pump flow rate. The calibration control unit 20 is configured to include a valve control unit (corresponding to a valve control means of the present invention) 21, as described below, for outputting a valve control current to the second solenoid proportional valve 10B when performing calibration, a pump control unit (corresponding to the pump control means of the present invention) 22 for sweepingly increasing and outputting a pump control current value, a calibration control unit (corresponding to the calibration control means of the present invention) 23 for calibrating the pump corresponding data PD, and the like.

Next, calibration control performed by the calibration control unit 20 will be described based on the flowchart in FIG. 2.

In addition, when performing calibration, as a preliminary preparation, the oil path connecting the first and second actuator ports 8*c* and 8*d* of the spool valve 8 to the first and second input/output ports 5*a* and 5*b* of the hydraulic actuator 5 is closed, and the output flow rate from the second actuator port 8*d* of the spool valve 8 flows to the oil tank 4 via a variable relief valve 14 of the relief oil path 12 described above. In this case, by setting the set pressure of the variable relief valve 14 to low pressure, the output flow rate from the spool valve 8 flows to the oil tank 4 in a low back pressure state.

First when an operation signal for starting a calibration operation is inputted from the monitor device 18, the calibration control unit 20 sets an arbitrary target flow rate as a calibration point (Step S1). The target flow rate can be arbitrarily set and changed by the monitor device 18.

Next, based on the calibrated valve corresponding data VD, a valve control current value corresponding to the output flow rate of the spool valve 8 of the target flow rate is calculated, and a calibration valve control current value is set to the valve control current value (Step S2). The calibration valve control current value is then output from the valve control unit 21 to the second solenoid proportional valve 10B (Step S3). The output of this calibration valve control current value continues until the calibration ends. As a result, the spool valve 8 switches to the second actuation position Y, and the opening area of the supply opening 8*f* at the second actuation position Y is fixed to the opening area corresponding to the calibration valve control current value.

Subsequently, in the state of outputting the calibration valve control current value, the pump control current value is output from the pump control unit 22 to the pump solenoid proportional valve 3 while sweepingly increasing the pump control current value at a predetermined constant speed suitable for sweeping (step S4).

Furthermore, during the sweeping increase of the pump control current value in step S4, the pump pressure of the hydraulic pump 2 is detected by a pressure sensor 17 (Step S5). Furthermore, a time differential value of the detected pump pressure is calculated, and a peak of a change of the pump pressure during a sweeping increase is detected based on the time differential value (Step S6).

In other words, if the pump control current value is sweepingly increased in a state that the opening area of the supply opening 8*f* of the spool valve 8 is maintained to be fixed to the opening area corresponding to the calibration valve control current value (the valve control current value corresponding to the output flow rate of the spool valve 8 of any target flow rate), the discharge oil of the hydraulic pump 2 flows to the oil tank 4 via the pressure compensation valve 9, the spool valve 8, and the variable relief valve 14 of the relief oil path 12, but in this case, if the pump flow rate that increases with the sweeping increasing of the pump control current value is less than the target flow rate, the output flow rate from the spool valve 8 that has passed through the supply opening 8*f* without resistance flows to the oil tank 4 at low back pressure, and the pump pressure is maintained at low pressure. From this state, when the pump control current value is further sweepingly increased to enable the pump flow rate to exceed the target flow rate, the resistance when the pump flow rate passes the supply opening 8*f* of the spool valve 8 increases, and the inlet side pressure of the spool valve 8 increases. As a result, the differential pressure before and after the spool valve 8 increases, and the pressure compensation valve 9 closes. Then, although the pump pressure increases sharply when the pressure compensation valve 9 is closed, a sharp increase in the pump pressure is detected based on the peak of the time differential value of the pump pressure.

Furthermore, in the calibration control unit 23, the pump control current value when the change of the pump pressure peaks is calculated, and the pump control current value is used as the pump control current value corresponding to the pump flow rate of the target flow rate to calibrate the pump corresponding data PD stored in the controller 1 (step S7).

In this case, when the set number of target flow rates set for performing the calibration is one, the calibration control unit 23 further takes the difference between the calibrated pump control current value and the pump control current value corresponding to the pump flow rate of the target flow rate in the pump corresponding data PD stored in the controller 1 as the calibration amount, calibrates the correspondence relationship between the pump flow rate of the pump corresponding data PD and the pump control current value over the entire range of the pump flow rate, and ends the calibration. In this case, even if the set number of the target flow rate is one, the intermediate area flow rate can be calibrated by taking the target flow rate as the flow rate of the intermediate area of the pump flow rate, thereby performing high-precision flow rate control over the entire area of the pump flow rate.

Figure 2:
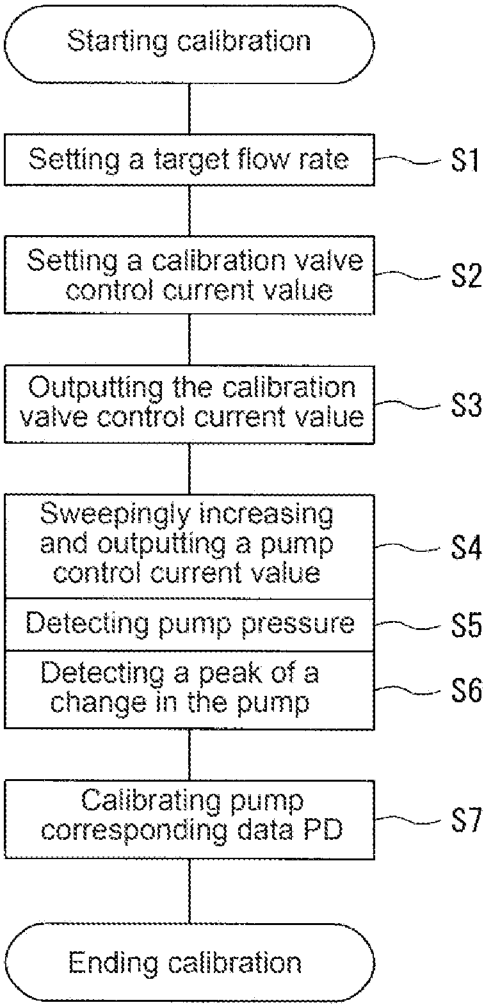
FIG. 2 is a flowchart illustrating a calibration procedure.

Further, when the set number of the target flow rate is plural, although not shown in the flowchart of FIG. 2, after steps S1 to S7 are performed for each target flow rate, the correspondence between the pump flow rate and the pump control current value in the pump corresponding data PD in the entire region of the pump flow rate is calibrated using a plurality of calibrated pump control current values, and then the calibration is completed. Thus, when the set number of target flow rates is plural, the flow rate control of the pump flow rate can be performed with higher accuracy.

Figure 3:
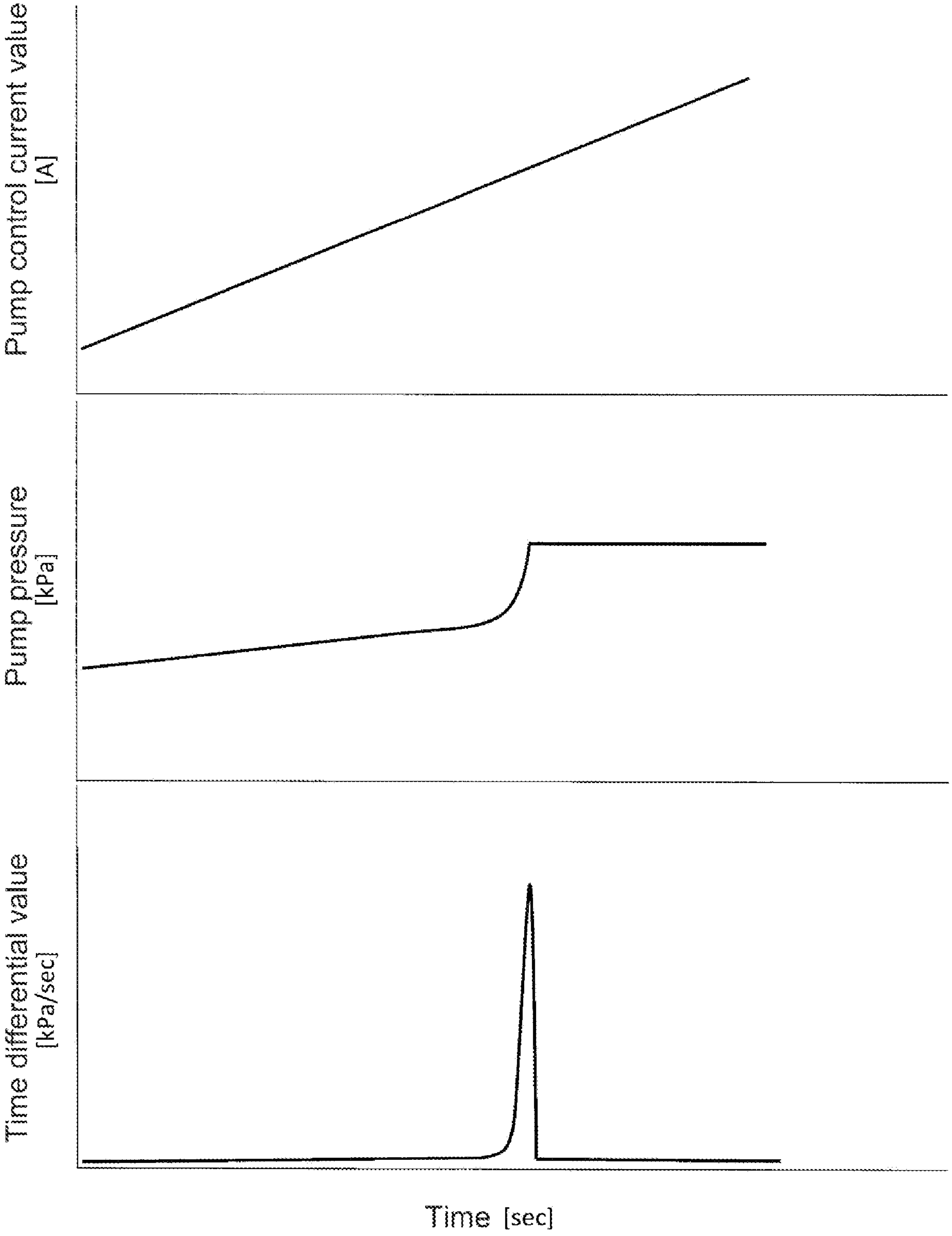
FIG. 3 is a diagram illustrating the relationship between the pump control current value and the time differential value of the pump pressure during calibration.

In addition, FIG. 3 shows a measured example of the relationship among the pump control current values output from the controller 1 at the time of performing the calibration, the pump pressure of the hydraulic pump 2, and the time differential values of the pump pressure. As shown in FIG. 3, the peak of the change of the pump pressure is detected by the peak of the time differential values.

In the present embodiment configured as described above, the hydraulic system of the working machine is provided with a variable capacity hydraulic pump 2 whose capacity is controlled variably according to the pump control current value, a spool valve 8 which is disposed on a pressurized oil supply path from the hydraulic pump 2 to the hydraulic actuator 5, and whose opening area of the supply opening **8*f* is controlled variably according to the valve control current value, a pressure compensation valve 9 which is disposed on the upstream side of the spool valve 8 and activated to maintain constant differential pressure before and after the spool valve 8, and a controller 1 which outputs the pump control current and the valve control current, and the like. However, in this case, in order to calibrate the correspondence relationship between the pump control current value and the pump flow rate of the hydraulic pump 2, a pressure sensor 17 for detecting the pump pressure of the hydraulic pump 2 is provided, and the relief oil path 12 is connected to the output side of the spool valve 8 for supplying the output flow rate of the spool valve 8 to the oil tank 4 in a low back pressure state. Further, the controller 1 is provided with a valve control means 21, which calculates a valve control current value corresponding to the output flow rate of the spool valve 8 of any set target flow rate based on the calibrated valve corresponding data VD of the valve control current value and the output flow rate of the spool valve 8, and outputs the valve control current value as the calibration valve control current value, a pump control means 22 which sweepingly increases the pump control current value in the state that the calibration valve control current value is being output, and a calibration control means 23** which calculates the pump control current value when a change of the pump pressure during a sweeping increase peaks, and calibrates the pump control current value as the pump control current value corresponding to the pump flow rate of the arbitrarily set target flow rate.

As described above, in the present embodiment, the calibration valve control current value is outputted from the controller 1 at the time of calibration, so that the opening area of the supply opening **8*f* of the spool valve 8 is maintained at the opening area corresponding to the output flow rate of the spool value 8 of an arbitrary target flow rate calculated based on the calibrated valve corresponding data VD, and in this state, the pump control current value is sweepingly increased, thereby increasing the pump flow rate of the hydraulic pump 2. Then, when the pump flow rate supplied to the supply opening 8*f* of the spool valve 8 exceeds the target flow rate, the pressure compensation valve 9 is closed to keep the differential pressure before and after the spool 8 to be constant. However, when the pressure compensation valve 9** is closed, the pump pressure rises sharply, and the sharp rise of the pump pressure is detected as a peak of the change of the pump pressure, and then the pump control current value at the peak of the change of the pump pressure is calibrated as a pump control current value corresponding to the pump flow rate of the target flow rate.

As a result, when the correspondence relationship between the pump control current value and the pump flow rate of the hydraulic pump is calibrated, the pump control current value of the pump flow rate of an arbitrarily set target flow rate can be calibrated based on the peak of the change of the pump pressure, and thus the calibration can be performed with high accuracy and high reliability without poor calibration accuracy as when the calibration is performed at the lowest pump flow rate and the maximum pump flow rate where the displacement point of the pump pressure is difficult to find. In addition, by calibrating the pump flow rate in the middle region by taking an arbitrarily set target flow rate as the middle region of the pump flow rate, high-precision control can be carried out over the entire range of the discharge flow rate of the hydraulic pump 2. Moreover, the calibration is performed only by outputting the valve control current value and the pump control current value from the controller 1 and detecting the pump pressure in the output, so that no special equipment for calibration is required, and efficient calibration can be performed with a simple structure.

The present invention is of course not limited to the above-described embodiments. For example, in the above-described embodiments, as the pressure relief oil path connected to the output side of the flow rate control valve (the spool valve 8) at the time of calibration, a pressure relief oil passage 12 is used which is provided in order to cause the oil discharged from the hydraulic actuator 5 to flow to the oil tank 4 in a low back pressure state when the hydraulic actuator 5 is a hydraulic actuator that is required to reduce the back pressure of a breaker, but in a case where such a relief oil path 12 is not provided, the pressure relief oil path of another section provided in the hydraulic system (not shown in FIG. 1) can be connected to the flow control valve in a piping connection so as to perform calibration.

In the above embodiment, the flow control valve (spool valve 8) is a pilot-operated valve in which a spool is moved by the pilot pressure outputted from the first and second solenoid proportional valves 10A and 10B into which the valve control current value is inputted. However, the flow control valve may be used as the solenoid valve and the valve control current value may be directly inputted to the flow control valve.

INDUSTRIAL APPLICABILITY

The present invention can be used to calibrate a correspondence relationship, in a hydraulic system of a working machine such as a hydraulic excavator, between a pump control current value output from a controller and a pump flow rate of a hydraulic pump.

What is claimed is:

1. A calibration system in a hydraulic system of a working machine, the hydraulic system of the working machine includes a variable capacity hydraulic pump whose capacity is variably controlled according to a pump control current value, a flow rate control valve which is provided in a pressurized oil supply path from the hydraulic pump to a hydraulic actuator and an opening area of a supply opening is variably controlled according to a valve control current value, a pressure compensation valve which is provided on an upstream side of the flow rate control valve and is actuated to keep differential pressure before and after the flow rate control valve to be constant, a relief oil path that is connected to an output side of the flow rate control valve to flow a relief output flow rate to an oil tank at low back pressure, the calibration system comprising:

a pressure detection means for detecting pump pressure of the hydraulic pump, and a controller for outputting a pump control current and a valve control current, and calibrating a correspondence relationship between the pump control current value and a pump flow rate of the hydraulic pump, wherein the controller includes:

a valve control means that calculates the valve control current value corresponding to an output flow rate of the flow rate control valve of an arbitrarily set target flow rate based on calibrated corresponding data of the valve control current value and the output flow rate of the flow rate control valve, and outputs the valve control current value as a calibration valve control current value;

a pump control means that sweepingly increases and outputs the pump control current value in a state of outputting the calibration valve control current value; and a calibration control means that calculates the pump control current value when a change of the pump pressure in a sweeping increase peaks, and calibrates the pump control current value as the pump control current value corresponding to the pump flow rate of the arbitrarily set target flow rate.

2. A calibration method in a hydraulic system of a working machine which includes a variable capacity hydraulic pump whose capacity is variably controlled according to a pump control current value, a flow rate control valve which is provided in a pressurized oil supply path from the hydraulic pump to a hydraulic actuator and an opening area of a supply opening is variably controlled according to a valve control current value, a pressure compensation valve which is provided on an upstream side of the flow rate control valve and is actuated to keep differential pressure before and after the flow rate control valve to be constant, and a controller for outputting a pump control current and a valve control current, and calibrating a correspondence relationship between the pump control current value and a pump flow rate of the hydraulic pump, a pressure detection means for detecting pump pressure of the hydraulic pump, and a relief oil path that is connected to an output side of the flow rate control valve to flow a relief output flow rate to an oil tank at low back pressure, wherein the calibration includes:

a step of calculating, on the basis of calibrated corresponding data between the valve control current value and an output flow rate of the flow rate control valve, the valve control current value corresponding to the output flow rate of the flow control valve of an arbitrarily set target flow rate, and outputting the valve control current value from the controller as a calibration valve control current value;

a step of sweepingly increasing and outputting from the controller the pump control current value in a state of outputting the calibration valve control current value; and a step of calculating the pump control current value when a change of the pump pressure in a sweeping increase peaks, and calibrating the pump control current value as the pump control current value corresponding to the pump flow rate of the arbitrarily set target flow rate.

* * * * *